(12) United States Patent
Funka et al.

(10) Patent No.: US 11,838,274 B1
(45) Date of Patent: Dec. 5, 2023

(54) PARALLEL TUNNELING WITH VIRTUAL PRIVATE NETWORK SERVERS

(71) Applicant: UAB 360 IT, Vilnius (LT)

(72) Inventors: Zenonas Funka, Kaunas (LT); Gytis Murauskas, Kaunas (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 18/074,492

(22) Filed: Dec. 4, 2022

Related U.S. Application Data

(63) Continuation of application No. 18/073,523, filed on Dec. 1, 2022.

(51) Int. Cl.
*H04L 9/40* (2022.01)

(52) U.S. Cl.
CPC ...... *H04L 63/0272* (2013.01); *H04L 63/0428* (2013.01)

(58) Field of Classification Search
CPC . H04L 63/0272; H04L 63/0428; H04L 63/04; H04L 63/0478; H04L 63/0435; H04L 63/0471
See application file for complete search history.

(56) References Cited

U.S. PATENT DOCUMENTS

| | | | |
|---|---|---|---|
| 10,944,631 B1 * | 3/2021 | Ganapathi | H04L 67/01 |
| 11,190,491 B1 * | 11/2021 | Kaciulis | H04L 63/029 |
| 11,271,858 B1 * | 3/2022 | Pabijanskas | H04L 61/50 |
| 11,368,335 B1 | 6/2022 | Celiesius | |
| 11,418,599 B1 * | 8/2022 | Lažauskas | H04L 67/1021 |
| 11,539,670 B1 * | 12/2022 | Valkaitis | H04L 63/0421 |
| 11,552,932 B1 * | 1/2023 | Kolaitis | H04L 63/0876 |
| 11,582,195 B1 * | 2/2023 | Karppanen | H04L 9/14 |
| 2011/0142053 A1 * | 6/2011 | Van Der Merwe | H04L 47/781 370/395.1 |
| 2015/0156174 A1 * | 6/2015 | Fahey | H04L 63/18 713/168 |
| 2020/0213183 A1 * | 7/2020 | Ojha | H04L 43/08 |
| 2022/0103523 A1 * | 3/2022 | Starr | H04L 63/0272 |
| 2022/0103525 A1 * | 3/2022 | Shribman | G06F 16/955 |

(Continued)

FOREIGN PATENT DOCUMENTS

| | | | | |
|---|---|---|---|---|
| EP | 1168718 A1 | 1/2002 | | |
| GB | 2458193 A * | 9/2009 | ......... | H04L 63/0272 |

(Continued)

*Primary Examiner* — Alina A Boutah
(74) *Attorney, Agent, or Firm* — The Pattani Law Group

(57) ABSTRACT

A method including establishing, by a user device, a first parallel VPN connection with a first VPN server and a second parallel VPN connection with a second VPN server; transmitting, by the user device, a request for a VPN service to the first VPN server over the first parallel VPN connection and to the second VPN server over the second parallel VPN connection; determining, by the user device based on transmitting the request, the first VPN server as an optimal VPN server when the first VPN server provides the VPN service before the second VPN server, or the second VPN server as the optimal VPN server when the second VPN server provides the VPN service before the second VPN server; and transmitting, by the user device based on selecting the optimal VPN server, requests for VPN services to the optimal VPN server is disclosed. Various other aspects are contemplated.

20 Claims, 7 Drawing Sheets

(56) References Cited

U.S. PATENT DOCUMENTS

| | | | |
|---|---|---|---|
| 2022/0210130 A1 | 6/2022 | Kaciulis et al. | |
| 2022/0368675 A1* | 11/2022 | Narula | H04L 43/0817 |
| 2023/0083991 A1* | 3/2023 | Žaliauskas | H04L 63/0435 |
| | | | 709/220 |

FOREIGN PATENT DOCUMENTS

| | | | | |
|---|---|---|---|---|
| JP | 2008146658 A | * | 6/2008 | H04L 29/06 |
| KR | 102486480 B1 | | 1/2023 | |

* cited by examiner

PARALLEL TUNNELING WITH VIRTUAL PRIVATE NETWORK SERVERS

CROSS REFERENCE

This application is a continuation of U.S. Non-Provisional patent application Ser. No. 18/073,523, filed on Dec. 1, 2022, and titled "Parallel Tunneling With Virtual Private Network Servers," the entire contents of which are incorporated herein by reference.

FIELD OF DISCLOSURE

Aspects of the present disclosure generally relate to a virtual private network (VPN), and more particularly to parallel tunneling with VPN servers in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded/encrypted, unreadable format with help of an encryption algorithm. Decryption may be associated with changing the data from being in the encoded/encrypted, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target (e.g., via the Internet). Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may include randomly generated strings of bits. Each key may be generated to be unique. A length of an encryption key may be given by a number of the randomly generated string bits, and the longer the length of the encryption key, the better (e.g., stronger) is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, Wireguard, and IKEv2.

SUMMARY

In one aspect, the present disclosure contemplates a method including establishing, by a user device, respective parallel virtual private network (VPN) connections with respective VPN servers; determining, by the user device based at least in part on establishing the respective parallel VPN connections, a default VPN server from among the respective VPN servers; selecting, by the user device based at least in part on determining the default VPN server, the default VPN server as a VPN server from which the user device is to receive a VPN service; and transmitting, by the user device based at least in part on selecting the default VPN server; a request to the default VPN server to receive the VPN service.

In another aspect, the present disclosure contemplates a device associated with a virtual private network (VPN), the device comprising a memory; and a processor communicatively coupled to the memory, the processor being configured to: establish respective parallel virtual private network (VPN) connections with respective VPN servers; determine, based at least in part on establishing the respective parallel VPN connections, a default VPN server from among the respective VPN servers; select, based at least in part on determining the default VPN server, the default VPN server as a VPN server from which the user device is to receive a VPN service; and transmit, based at least in part on selecting the default VPN server; a request to the default VPN server to receive the VPN service.

In another aspect, the present disclosure contemplates a non-transitory computer readable medium storing instructions, which when executed by a processor configure the processor to: establish respective parallel virtual private network (VPN) connections with respective VPN servers; determine, based at least in part on establishing the respective parallel VPN connections, a default VPN server from among the respective VPN servers; select, based at least in part on determining the default VPN server, the default VPN server as a VPN server from which the user device is to receive a VPN service; and transmit, based at least in part on selecting the default VPN server; a request to the default VPN server to receive the VPN service.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
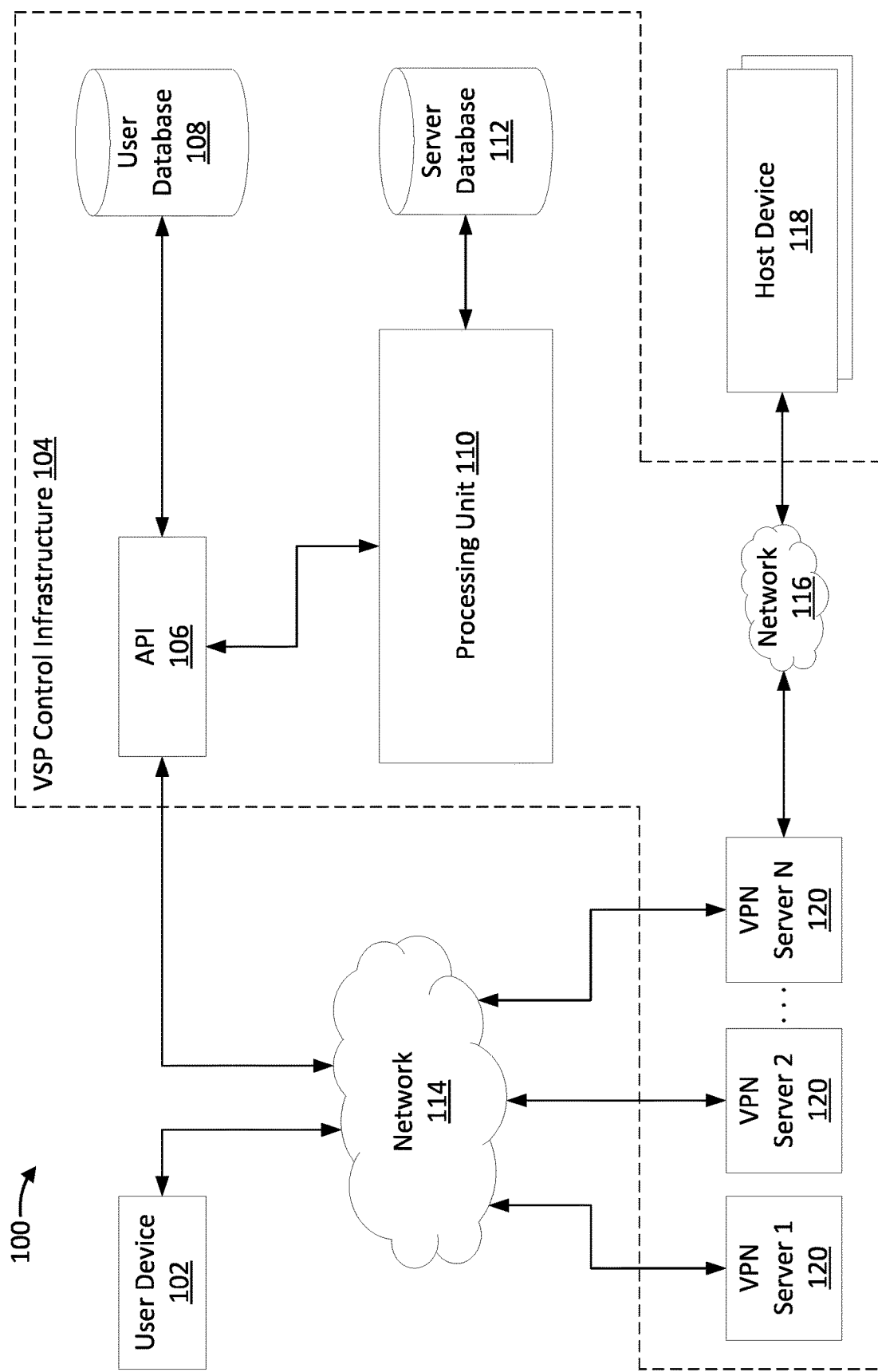

FIG. 1 is an illustration of an example system associated with dynamic parallel tunneling with VPN servers, according to various aspects of the present disclosure.

Figure 2:
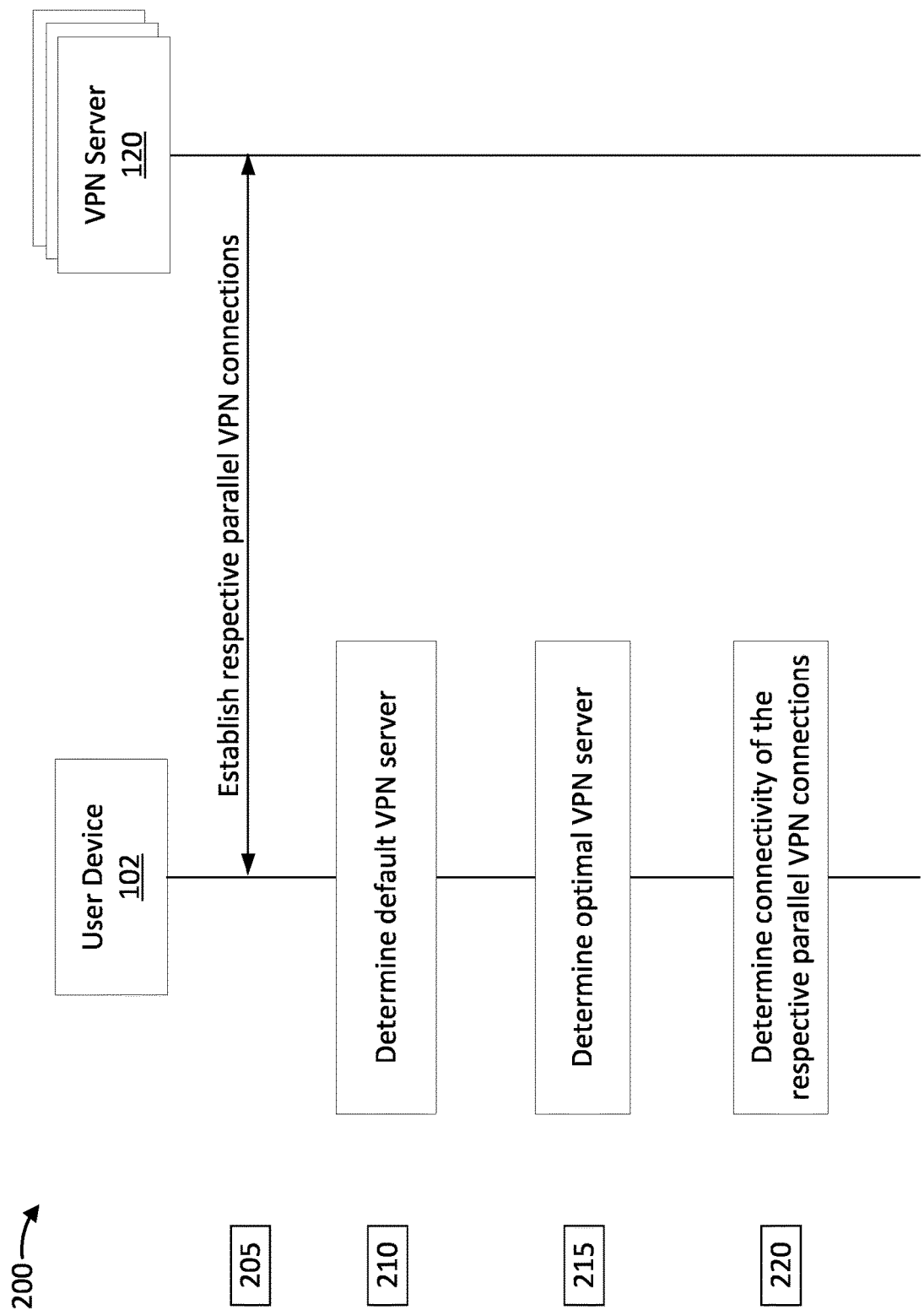

FIG. 2 is an illustration of an example flow associated with dynamic parallel tunneling with VPN servers, according to various aspects of the present disclosure.

Figure 3:
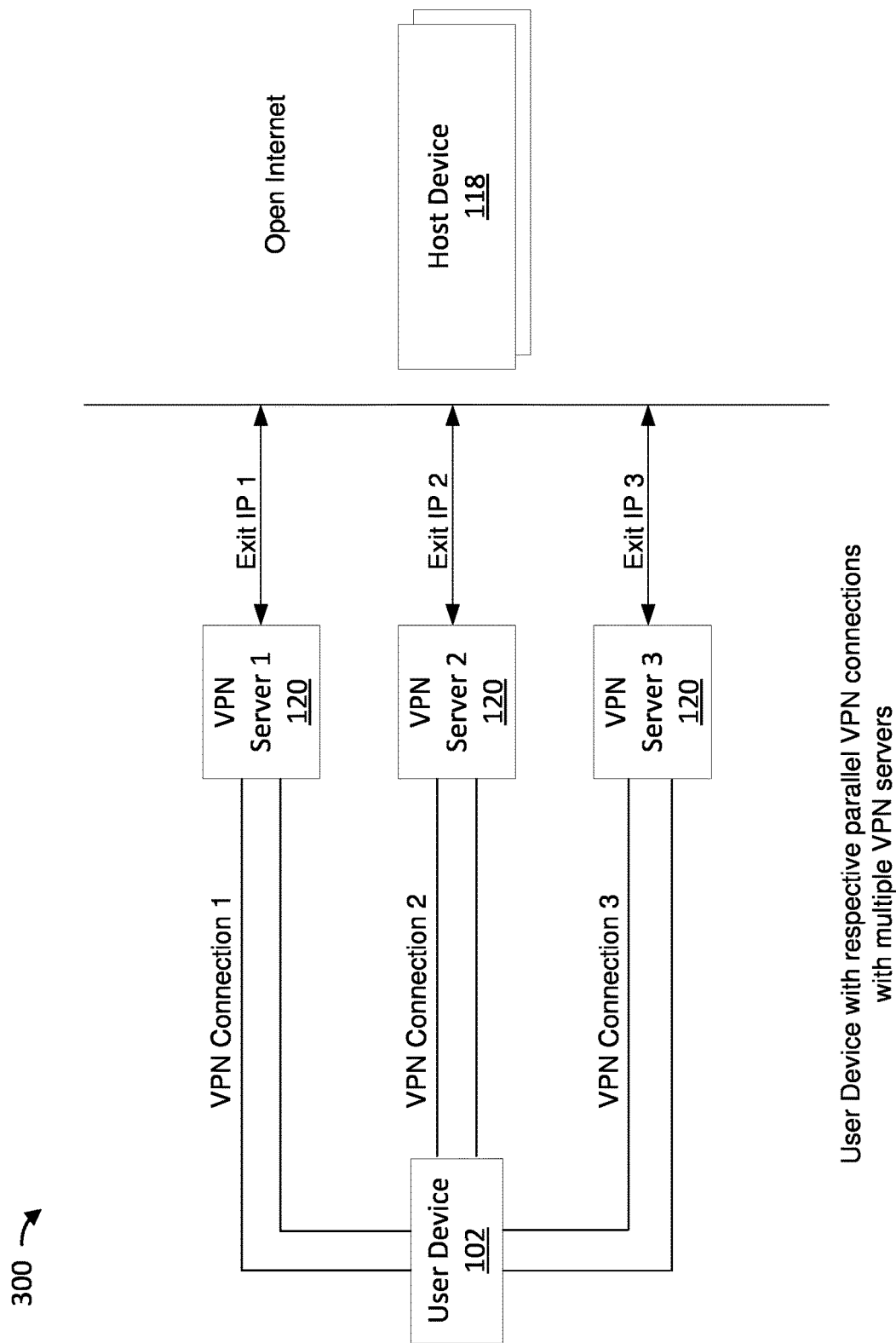

FIG. 3 is an illustration of an example associated with dynamic parallel tunneling with VPN servers, according to various aspects of the present disclosure.

Figure 4:
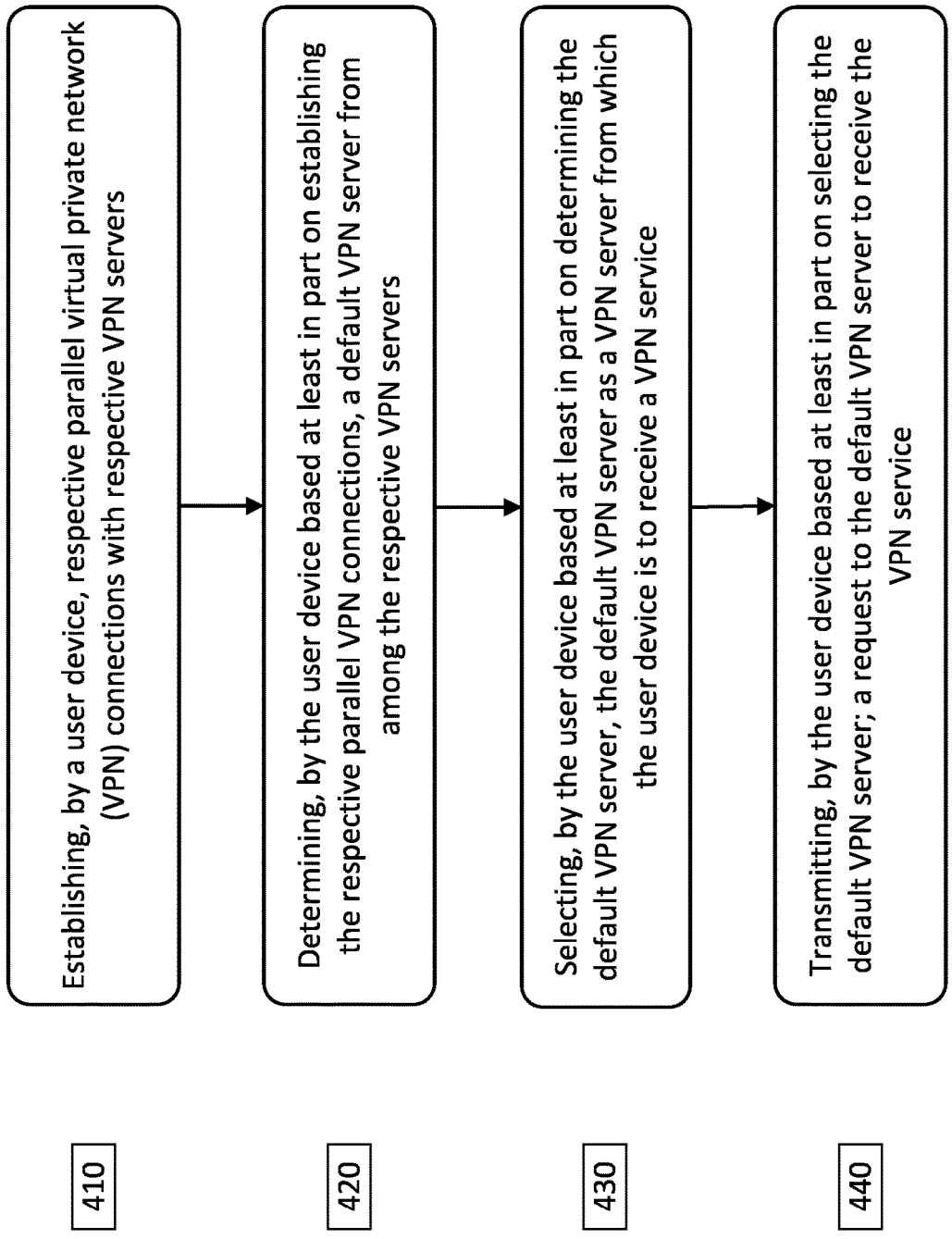

FIG. 4 is an illustration of an example process associated with dynamic parallel tunneling with VPN servers, according to various aspects of the present disclosure.

Figure 5:
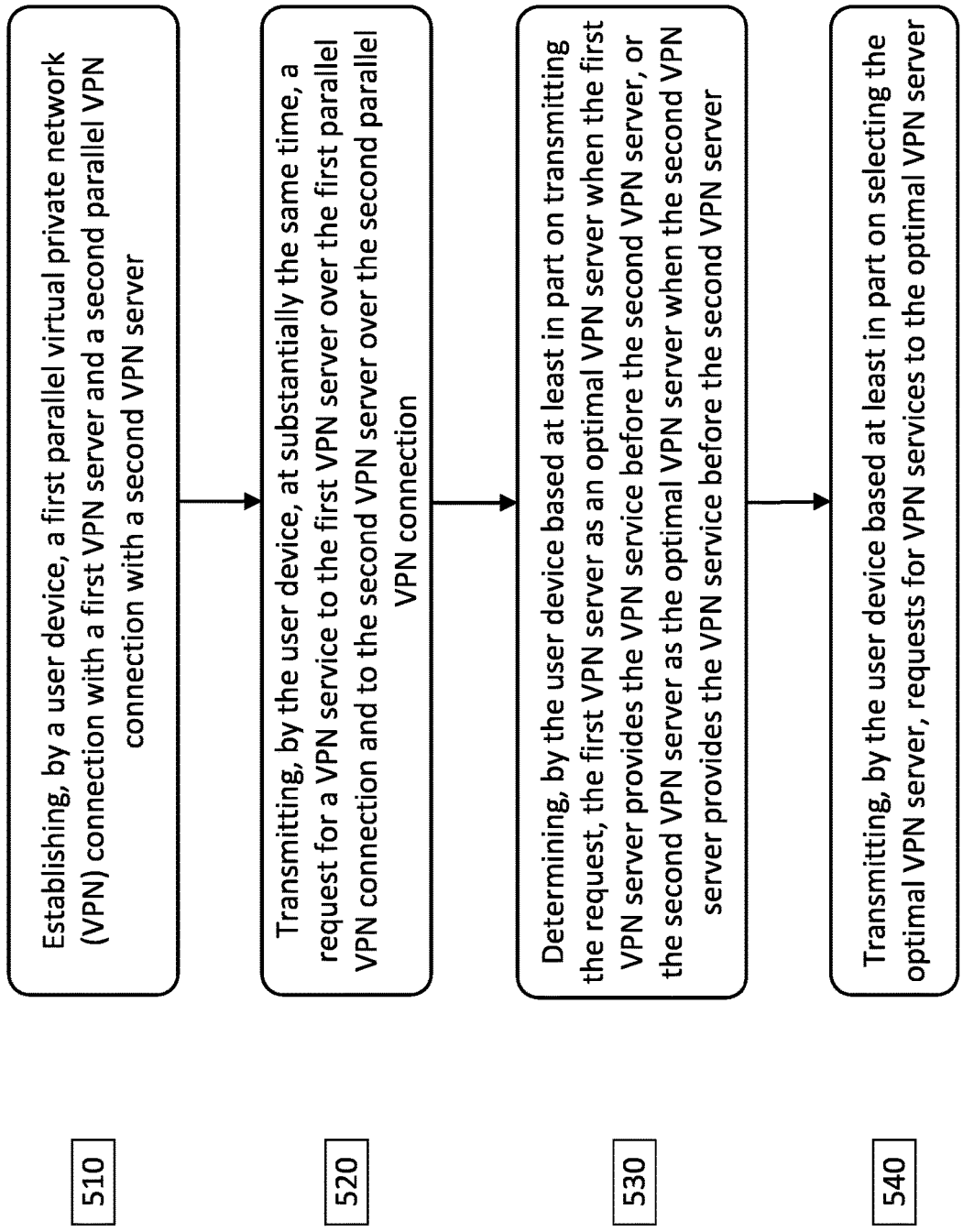

FIG. 5 is an illustration of an example process associated with dynamic parallel tunneling with VPN servers, according to various aspects of the present disclosure.

Figure 6:
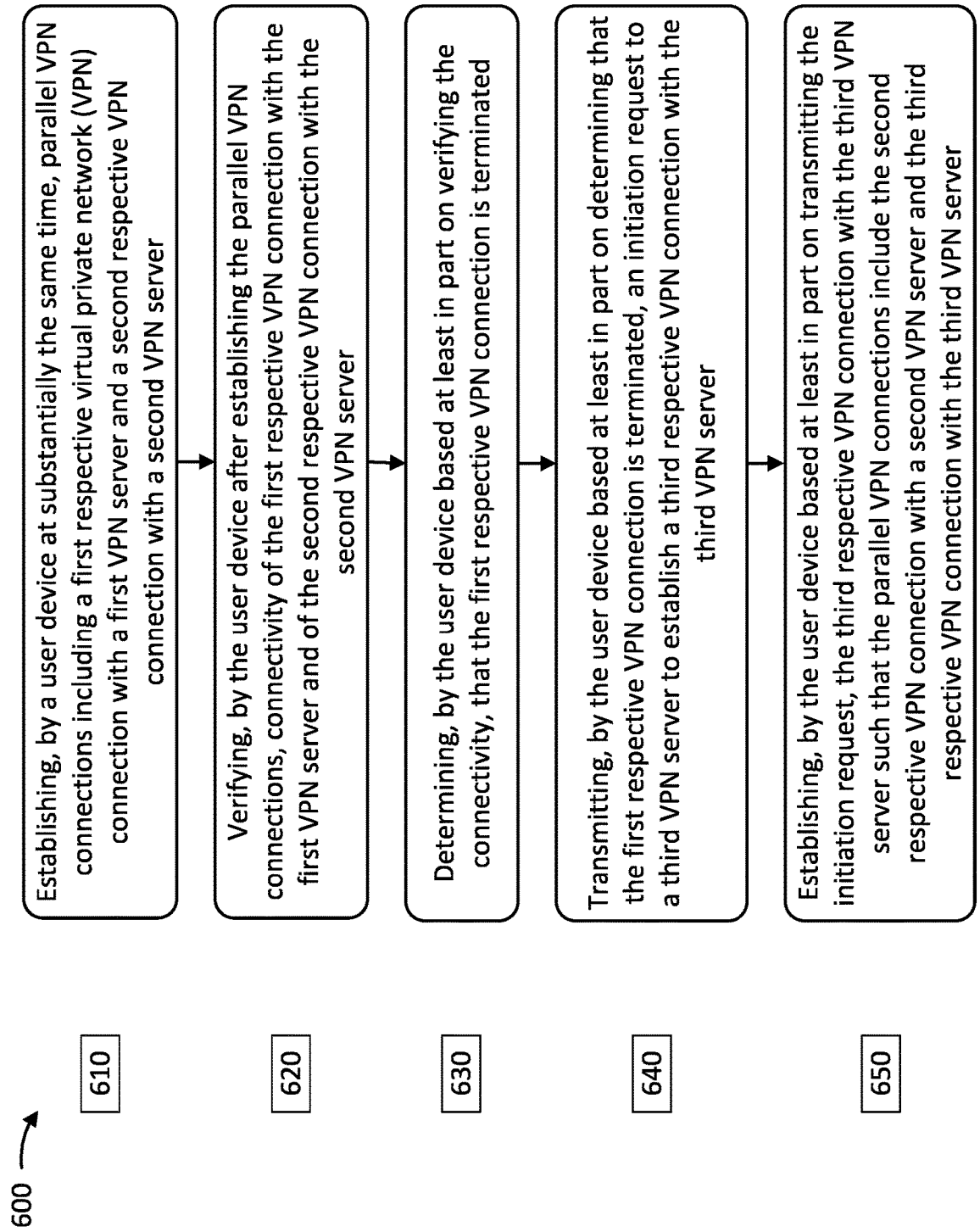

FIG. 6 is an illustration of an example process associated with dynamic parallel tunneling with VPN servers, according to various aspects of the present disclosure.

Figure 7:
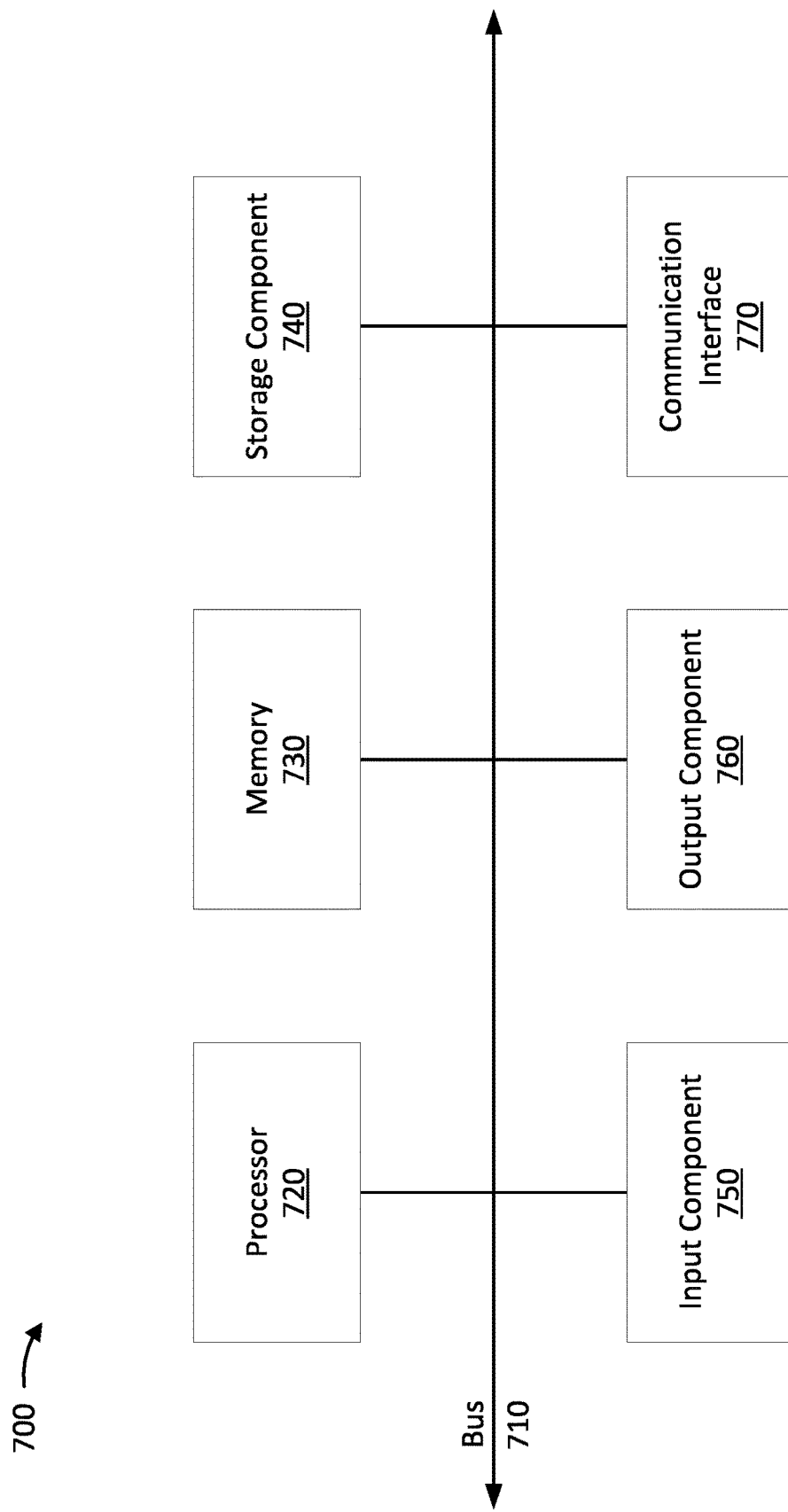

FIG. 7 is an illustration of example devices associated with dynamic parallel tunneling with VPN servers, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with dynamic parallel tunneling with VPN servers, according to various aspects of the present disclosure. Example 100 shows an architectural depiction of components included in system 100. In some aspects, the components may include a user device 102 capable of communicating with a VPN service provider (VSP) control infrastructure 104 and/or with one or more VPN servers 120 over a network 114. The VSP control infrastructure 104 may be controlled by a VPN service provider and may include an application programming interface (API) 106, a user database 108, processing unit 110, a server database 112, and the one or more VPN servers 120. As shown in FIG. 1, the API 106 may be capable of communicating with the user database 108 and with the processing unit 110. Additionally, the processing unit 110 may be capable of communicating with the server database and a testing module (not shown) to communicate with the one or more VPN servers 120 over the network 114. The processing unit 110 may be capable of configuring and controlling operation of the one or more VPN servers 120. The VPN servers 120 may be configured to communicate with one or more host devices to, for example, request and retrieve data of interest. Further, as shown in FIG. 1, the VPN servers 120 may be configured to communicate with one or more secondary servers 118 or routing of requests for data of interest received from the user device 102. The VPN servers 120 may also be configured to communicate with an authentication server (not shown) over the network. The processing unit 110 may be capable of configuring and controlling operation of the authentication server. In some aspects, the network 116 may be similar to network 114.

The user device 102 may be a physical computing device capable of hosting a VPN application and of connecting to the network 114. The user device 102 may be, for example, a laptop, a mobile phone, a tablet computer, a desktop computer, a smart device, a router, or the like. In some aspects, the user device 102 may include, for example, Internet-of-Things (IoT) devices such as smart home appliances, smart home security systems, autonomous vehicles, smart health monitors, smart factory equipment, wireless inventory trackers, biometric cyber security scanners, or the like.

The network 114 and/or the network 116 may be any digital telecommunication network that permits several nodes to share and access resources. In some aspects, the network 114 and/or the network 116 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 114, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authorized user. In yet another example, the credentials may be associated with additional factors such as knowledge, possession, inheritance, or the like. Knowledge factors may include items (e.g., pin numbers) that an authorized user may be expected to know. Possession factors may include items (e.g., one-time password (OTP) tokens) that an authorized user may be expected to possess at a time associated with the authentication. Inherent factors may include biometric items (e.g., fingerprint scans, retina scans, iris scans, or the like) that may be inherent traits of an authorized user. The API 106 may provide the received credentials to the user database 108 for verification.

The user database 108 may include a structured repository of valid credentials belonging to authorized users. In one example, the structured repository may include one or more tables containing valid unique combinations of user IDs and passwords belonging to authorized users. In another example, the structured repository may include one or more tables containing valid unique validation codes associated with authorized users. The VPN service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may enable the user device 102 to obtain VPN services. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection with one or more optimal VPN servers 120. The processing unit 110 included in the VSP control infrastructure may be configured to determine/identify a single VPN server 120 as an optimal server or a list of VPN servers as multiple optimal VPN servers. The processing unit 110 may utilize the API 106 to transmit an entry IP address of the optimal VPN server to the user device 102. In some aspects, the processing unit 110 may be configured to determine/identify a list of multiple optimal VPN servers. In this case, the processing unit 110 may utilize the API 106 to transmit respective entry IP addresses of the multiple optimal VPN servers 120 to the user device 102.

In some aspects, the processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, based at least in part on server penalty scores calculated utilizing the complex operations and/or the arithmetical and logical operations, the processing unit 110 may determine/identify the single VPN server 120 or the multiple VPN servers 120. In one example, the processing unit 110 may determine the single VPN server 120 with the lowest server penalty score as the optimal VPN server 120. In another example, the processing unit 110 may determine the list of multiple VPN servers 120 by including, for example, three (or any other number) VPN servers 120 with the three lowest server penalty scores.

The user device 102 may transmit to the single (e.g., optimal) VPN server 120 an initiation request to establish a VPN connection (e.g., an encrypted tunnel) with the optimal VPN server 120. The optimal VPN server 120 with which the user device establishes the encrypted tunnel may be referred to as a primary VPN server or an entry VPN server. Based at least in part on receiving the initiation request, the optimal VPN server 120 may conduct a VPN authentication with an authentication server (not shown) to authenticate the user device 102 as a device that is authorized to receive the VPN services. When the VPN authentication is successful, the optimal VPN server 120 may proceed to establish the VPN connection and to provide the VPN services to the user device 102. Alternatively, when the VPN authentication fails, the optimal VPN server 120 may refrain from establishing the VPN connection and from providing the VPN services to the user device 102. In some aspects, the optimal VPN server 120 may communicate with the user device 102 to obtain additional information to authenticate the user device 102.

In some aspects, the user device 102 may, at substantially the same time, transmit to the multiple optimal VPN servers 120 respective initiation requests to establish respective parallel VPN connections (e.g., respective encrypted tunnels) with the multiple VPN servers 120. Based at least in part on receiving the respective initiation requests, the multiple VPN servers 120 may conduct respective VPN authentications with one or more authentication servers (not shown) to authenticate the user device 102 as a device that is authorized to receive the VPN services. When the respective VPN authentications are successful, the multiple VPN servers 120 may proceed to establish the respective parallel VPN connections and to provide the VPN services to the user device 102. Alternatively, when the respective VPN authentications fail, the multiple VPN servers 120 may refrain from establishing the respective parallel VPN connections and from providing the VPN services to the user device 102. In some aspects, one or more of the multiple VPN servers 120 may communicate with the user device 102 to obtain additional information to authenticate the user device 102.

In some aspects, a VPN server 120 may include a piece of physical or virtual computer hardware and/or software capable of securely communicating with (the VPN application on) the user device 102 for provision of VPN services. Similarly, the authentication server may include a piece of physical or virtual computer hardware and/or software capable of securely communicating with one or more VPN servers 120 for provision of authentication services.

The one or more host devices 122 may include a type of server that hosts or houses websites and/or related data, applications, and/or services. The one or more host devices 122 may be a remotely accessible Internet server with complete Web server functionality and resources. In some aspects, the one or more host devices 122 may be referred to as a Web hosting server.

One or more components (e.g., API 106, user database 108, processing unit 110, server database 112, network 114, 116, and/or VPN server 120) included in the VSP control infrastructure 104 and/or one or more components (e.g., processing unit, memory, communication interface, etc.) included in the user device 102 may further be associated with a controller/processor, a memory, a communication interface, or a combination thereof (e.g., FIG. 7). For instance, the one or more components may include or may be included in a controller/processor, a memory, or a combination thereof. In some aspects, the one or more components may be separate and distinct from each other. Alternatively, in some aspects, the one or more components may be combined with another one of the one or more components. In some aspects, the one or more components may be local with respect to each other. Alternatively, in some aspects, the one or more components may be located remotely with respect to another one of the one or more components. Additionally, or alternatively, the one or more components may be implemented at least in part as software stored in a memory. For example, a component (or a portion of a component) may be implemented as instructions or code stored in a non-transitory computer-readable medium and executable by a hardware controller or a hardware processor to perform the functions or operations of the component. Additionally, or alternatively, the one or more components may be configured to perform one or more functions described as being performed by another one of the one or more components.

As indicated above, FIG. 1 is provided as an example. Other examples may differ from what is described with regard to FIG. 1.

A user device may seek to obtain VPN services from a VSP control infrastructure. Based at least in part on authentication of the user device, the VSP control infrastructure may select a VPN server (e.g., optimal VPN server) to provide the VPN services to the user device. In an example, the VSP control infrastructure may provide the user device with an entry IP address associated with the VPN server. The user device may utilize the entry IP address to communicate and establish a VPN connection (e.g., encrypted tunnel) with the VPN server. Based at least in part on the VPN connection being established, the VSP control infrastructure and/or the VPN server may assign an exit IP address to the user device.

During the established VPN connection (e.g., while the given VPN connection remains established), the VPN server may utilize the entry IP address and the assigned exit IP address to process requests received from the user device. For instance, during the established VPN connection, the VPN server may utilize the entry IP address to receive a request from the user device for retrieving data of interest from a host device and may utilize the exit IP address to retrieve the data of interest from the host device. Utilizing the exit IP address may include the VPN server utilizing the exit IP address to communicate (e.g., transmit and/or receive communications) with the host device to retrieve the data of interest. Further, the VPN server may utilize a correlation between the exit IP address and the entry IP address to transmit the retrieved data of interest to the user device.

In some cases, the host device may examine the exit IP address and determine that the exit IP address is an IP address associated with a commercial entity (e.g., the VPN server). For instance, the host device may determine that the exit IP address is an IP address assigned for commercial use by the commercial entity. In an example, the host device may determine that the exit IP address is being utilized to mask information (e.g., an identity) regarding the user device, thereby purposefully hiding such information from the host device. As a result, the host device may decline to provide the data of interest requested via utilization of the exit IP address. Further, the host device may temporarily or permanently discard all communication received via utilization of the exit IP address. In this case, the VPN server may be unable to retrieve data of interest from the host device for any user device.

In some cases, the VPN server may fail to remain optimal for providing the VPN services to the user device. In an example, the VPN server may become overloaded with a threshold amount of user devices establishing VPN connections with the VPN server, thereby having reduced bandwidth to provide the VPN services to the user device.

In some cases, the VPN server may become unavailable while providing the VPN services. In an example, the VPN server may go out of service due to a malfunction. In another example, the VPN server may go out of service for having to undergo maintenance.

In such cases, to continue to receive the VPN services and/or to optimally receive the VPN services, the user device may terminate the established VPN connection with the VPN server and establish a new VPN connection with a new VPN server. Terminating the established VPN connection, establishing the new VPN connection with the new VPN server, and again requesting/obtaining the data of interest may inefficiently consume user device resources (e.g., processing resources, memory resources, power consumption resources, battery life, or the like) and VPN resources (computational resources, network bandwidth, management resources, processing resources, memory resources, or the like) that may otherwise be used to perform suitable tasks associated with the VPN.

Various aspects of systems and techniques discussed in the present disclosure enable dynamic parallel tunneling with VPN servers in a VPN. In some aspects, a VSP control infrastructure may configure multiple VPN servers to provide VPN services to a user device. Further, the VSP control infrastructure may enable the user device to establish multiple respective VPN connections (e.g., parallel encrypted tunnels) with the multiple VPN servers. As a result, the user device may receive the VPN services from the multiple VPN servers at substantially the same time. In some aspects, a VPN server, from among the multiple VPN servers, to first establish a respective VPN connection with the user device may be determined as a default VPN server. The user device may initially transmit data requests to the default VPN server. In some aspects, during the multiple respective VPN connections (e.g., while the multiple respective VPN connections are active and/or maintained), the user device may verify, in real time, connectivity with each of the multiple VPN servers by determining statuses of each of the respective VPN connections. In some aspects, the user device may transmit respective query pings to each of the multiple VPN servers over the respective VPN connections and may receive response pings from each of the multiple VPN servers over the respective VPN connections to verify the connectivity. The user device may verify the connectivity periodically. Further, during the multiple respective VPN connections, the user device may determine, in real time, which of the multiple VPN servers is the current optimal VPN server for providing the VPN services to the user device. In some aspects, the user device may, at substantially the same time, request a VPN service from each of the multiple VPN servers, and may determine the VPN server that first provides the VPN service as the current optimal VPN server. When the current optimal VPN server is different from the default VPN server, the user device may start request VPN services from the optimal VPN server instead of from the default VPN server (or a previous optimal VPN server). The user device may determine the optimal VPN server periodically. In this way, by establishing multiple respective VPN connections (e.g., parallel encrypted tunnels) with the multiple VPN servers and/or by periodically determining the optimal VPN server, the user device may continue to optimally receive the VPN services without terminating established VPN connections and/or without establishing new VPN connections. As a result, efficient utilization of user device resources (e.g., processing resources, memory resources, power consumption resources, battery life, or the like) and VPN resources (computational resources, network bandwidth, management resources, processing resources, memory resources, or the like) may be enabled.

In some aspects, a processor (e.g., processor 720) associated with the user device may establish respective parallel virtual private network (VPN) connections with respective VPN servers; determine, based at least in part on establishing the respective parallel VPN connections, a default VPN server from among the respective VPN servers; select, based at least in part on determining the default VPN server, the default VPN server as a VPN server from which the user device is to receive a VPN service; and transmit, based at least in part on selecting the default VPN server; a request to the default VPN server to receive the VPN service.

FIG. 2 is an illustration of an example flow 200 associated with dynamic parallel tunneling with VPN servers in a VPN, according to various aspects of the present disclosure. Example flow 200 includes a user device 102 in communication with multiple VPN servers 120. In some aspects, the user device 102 may communicate with the multiple VPN servers 120 over a network (e.g., network 114). In some aspects, the multiple VPN servers 120 may include VPN servers selected by the user device 102 from a list of optimal VPN servers 120 provided by the VSP control infrastructure 104 to the user device 102.

The user device 102 may install a client application being associated with (e.g., provided by) the VSP control infrastructure 104. The user device 102 may utilize the client application to communicate with an application programming interface (API 106) and/or a processor (e.g., processing unit 110, processor 720) associated with the VSP control infrastructure 104. As discussed elsewhere herein, the user device 102 may utilize the client application to receive VPN services from the multiple VPN servers.

In some aspects, the client application may enable the user device 102 to receive information to be processed by the client application and/or by the VSP control infrastructure 104. In an example, the client application may include a graphical user interface to receive the information via local input interfaces (e.g., touch screen, keyboard, mouse, pointer, etc.) associated with the user device 102. The information may be received via text input or via a selection from among a plurality of options (e.g., pull down menu, etc.). In some aspects, the client application may activate and/or enable, at a suitable time associated with receiving the VPN services, the graphical interface for receiving the information. For instance, the client application may cause a screen (e.g., local screen) associated with the user device 102 to display, for example, a pop-up message to request entry of the information. Further, the client application may enable transmission of at least a portion of the information to the VSP control infrastructure 104. In some aspects, the client application may utilize a processing unit (e.g., processor 720) associated with the user device 102 to perform processes/operations associated with obtaining the VPN services.

As shown by reference numeral 205, the user device 102 and the multiple VPN servers 120 may communicate to establish respective parallel VPN connections. In some aspects, at substantially the same time (e.g., simultaneously), the user device 102 may transmit to the multiple VPN servers 120 respective initiation requests to establish the respective parallel VPN connections (e.g., respective encrypted tunnels) with the multiple VPN servers 120. Based at least in part on receiving the respective initiation requests, the multiple VPN servers 120 may conduct respective VPN authentications with one or more authentication servers (not shown) to authenticate the user device 102 as a device that is authorized to receive the VPN services. When the respective VPN authentications are successful, the multiple VPN servers 120 may proceed to establish the respective parallel VPN connections and to provide the VPN services to the user device 102.

FIG. 3 is an illustration of an example 300 associated with dynamic parallel tunneling with VPN servers in a VPN, according to various aspects of the present disclosure. Example 300 shows the user device 102 having established respective parallel VPN connections (e.g., parallel tunneling) with the multiple VPN servers 120. Although example 300 shows three VPN servers, the present disclosure contemplates the user device 102 having established respective parallel VPN connections with any number of VPN servers.

In some aspects, the established respective parallel VPN connections may utilize any combination of VPN protocols including, for example, Wireguard, IKEv2, OpenVPN, or the like. In an example, each respective parallel VPN connection (e.g., VPN connection 1, VPN connection 2, VPN connection 3, etc.) between the user device 102 and the multiple VPN servers 120 may utilize Wireguard (or IKEv2 or OpenVPN) protocol. In another example, a first VPN connection (e.g., VPN connection 1) between the user device 102 and a first VPN server 120 may utilize Wireguard, a second VPN connection (e.g., VPN connection 2) between the user device 102 and a second VPN server 120 may utilize IKEv2, a third VPN connection (e.g., VPN connection 3) between the user device and a third VPN server 120 may utilize OpenVPN, and so on.

In some aspects, the established respective parallel VPN connections may utilize cryptographic schemes for encryption and decryption of data communicated between the user device 102 and the multiple VPN servers 120 over the established respective parallel VPN connections. In some aspects, the respective parallel VPN connections may utilize the same cryptographic scheme. In an example, the user device 102 and the multiple VPN servers 120 may utilize the same encryption algorithm and/or the same decryption algorithm to encrypt and/or decrypt data communicated over the respective parallel VPN connections. In some aspects, the respective parallel VPN connections may utilize different cryptographic schemes. In an example, a first VPN connection (e.g., VPN connection 1) between the user device 102 and a first VPN server 120 may utilize a first encryption algorithm and/or a first decryption algorithm, a second VPN connection (e.g., VPN connection 2) between the user device 102 and a second VPN server 120 may utilize a second encryption algorithm and/or a second decryption algorithm, a third VPN connection (e.g., VPN connection 3) between the user device 102 and a third VPN server 120 may utilize a third encryption algorithm and/or a third decryption algorithm, and so on. In this case, the first encryption algorithm and/or the first decryption algorithm, the second encryption algorithm and/or the second decryption algorithm, and/or the third encryption algorithm and/or the third decryption algorithm may be different with respect to each other.

In some aspects, the established respective parallel VPN connections may utilize cryptographic keys for encryption and decryption of data communicated between the user device 102 and the multiple VPN servers 120 over the established respective parallel VPN connections. In some aspects, the respective parallel VPN connections may utilize the same cryptographic keys. In an example, the user device 102 and the multiple VPN servers 120 may utilize the same encryption key and/or the same decryption key to encrypt and/or decrypt data communicated over the respective parallel VPN connections. In some aspects, the respective parallel VPN connections may utilize different cryptographic keys. In an example, a first VPN connection (e.g., VPN connection 1) between the user device 102 and a first VPN server 120 may utilize a first encryption key and/or a first decryption key, a second VPN connection (e.g., VPN connection 2) between the user device 102 and a second VPN server 120 may utilize a second encryption key and/or a second decryption key, a third VPN connection (e.g., VPN connection 3) between the user device 102 and a third VPN server 120 may utilize a third encryption key and/or a third decryption key, and so on. In this case, the first encryption key and/or the first decryption key, the second encryption key and/or the second decryption key, and/or the third encryption key and/or the third decryption key may be different with respect to each other.

Also, as shown in FIG. 3, based at least in part on the respective parallel VPN connections being established, the multiple VPN servers 120 may assign respective exit IP addresses (e.g., exit IP address 1, exit IP address 2, exit IP address 3, and so on) to the user device 102. In some aspects, the multiple VPN servers 120 may respectively select the respective exit IP addresses from among a plurality of exit IP addresses included in respective pools of exit IP addresses available to the multiple VPN servers 120. In some aspects, the multiple VPN servers 120 may utilize respective nftable network filters to assign the respective exit IP addresses. In some aspects, the VSP control infrastructure 104 (e.g., processing unit 110) may configure the multiple VPN servers 120 with respect to assigning of the respective exit IP addresses. For instance, the VSP control infrastructure 104 may configure the multiple VPN servers 120 to select and/or assign a respective exit IP addresses randomly or to select and/or assign the respective exit IP addresses sequentially. Based at least in part on assigning the respective exit IP addresses to the user device 102, the multiple VPN servers 120 may utilize the respective exit IP addresses to retrieve, from one or more host devices, data of interest that is requested by the user device 102.

As shown by reference numeral 210, the user device 102 may determine a default VPN server 120 from among the multiple VPN servers 120. In some aspects, the default VPN server may include a VPN server 120 from which the user device 102 may receive the VPN services. In an example, the user device 102 may transmit data requests to the default VPN server. In an example, the user device 102 may select the VPN server 120, from among the multiple VPN servers 120, that first completes the respective authentication with an authentication server and/or first establishes a VPN connection with the user device 102 as the default VPN server. In some aspects, the default VPN server may first complete the respective authentication and/or first establish the VPN connection with the user device 102 because the default VPN server may currently be an optimal VPN server to provide the VPN services to the user device 102. In an example, the default VPN server may be located geographically/physically closer (and therefore able to provide speedier service) to the user device 102 as compared to the other VPN servers from among the multiple VPN servers 120. In another example, the default VPN server may have a highest available bandwidth to provide the VPN services to the user device 102 as compared to the other VPN servers from among the multiple VPN servers 120. In yet another example, the default VPN server may be located geographically/physically closer to an international Internet exchange hub (and therefore able to provide speedier service) as compared to the other VPN servers from among the multiple VPN servers 120.

A data request may include a request for the default VPN server to retrieve and provide data of interest to the user device 102. The user device 102 may transmit the data request by utilizing a client application configured and provided by the VSP control infrastructure or a browser installed on the user device 102. The data request may be associated with initiating a connection with a website on the Internet, or may request the VPN server 120 to retrieve and provide data of interest from a host device (e.g., host device 118) that is hosting the website.

Based at least in part on establishing the respective parallel VPN connections with the multiple VPN servers 120, as shown by reference numeral 215, the user device 102 may determine a current optimal VPN server from among the multiple VPN servers 120. In an example, to determine the current optimal VPN server, the user device 102 may transmit, at substantially the same time, a data request for a threshold amount of data of interest (e.g., VPN service) to each of the multiple VPN servers 120 over the respective VPN connections. As a result, the user device 102 may receive the threshold amount of data of interest from each of the multiple VPN servers 120 over the respective VPN connections. The user device 102 may determine the VPN server 120 that first provides the threshold amount of data as the current optimal VPN server. When the current optimal VPN server is different from the default VPN server (or a previously determined optimal VPN server), the user device may start requesting VPN services from the optimal VPN server instead of from the default VPN server (or the previously determined optimal VPN server).

In some aspects, the user device 102 may determine the optimal VPN server periodically. A period associated with determining the current optimal VPN server may be different based at least in part on a technology utilized by the user device 102 to access a network (e.g., Internet). For instance, the user device 102 may be configured to utilize a plurality of technologies including stationary technology (e.g., Wi-Fi) or mobile technology (e.g., LTE, CDMA, GSM, etc.) to access the network. When the user device 102 is utilizing the stationary technology, the user device 102 may determine the current optimal VPN server at a first periodicity (e.g., every 60 minutes, every 120 minutes, etc.). When the user device 102 is utilizing the mobile technology, the user device 102 may determine the current optimal VPN server and a second periodicity (e.g., every 180 minutes, every 240 minutes, etc.). In this way, the user device 102 may enable conservation of resources (e.g., battery life) while using the mobile technology.

In some aspects, the user device 102 may determine the current optimal VPN server based at least in part on determining a change in the technology utilized by the user device 102 to access a network (e.g., Internet). In an example, while utilizing the stationary technology, the user device 102 may change its location and begin utilizing the mobile technology to access the network, or vice versa. In this case, based at least in part on determining a change in the technology utilized by the user device 102 to access the network, the user device 102 may determine the current optimal VPN server. In this way, the user device 102 may receive the VPN services from a VPN server that may be configured, and therefore more suitable, to provide VPN services for a given technology for accessing the network.

As shown by reference numeral 220, the user device 102 may determine connectivity of the respective parallel VPN connections. In some aspects, during the respective parallel VPN connections (e.g., while the respective parallel VPN connections are active and/or maintained), the user device 102 may verify, in real time, connectivity with each of the multiple VPN servers 120 by determining statuses of each of the respective parallel VPN connections. In some aspects, the user device 102 may transmit, at substantially the same time, respective query pings to each of the multiple VPN servers 120 over the respective parallel VPN connections, and may receive response pings from each of the multiple VPN servers 120 over the respective VPN connections to verify the connectivity.

In some aspects, the user device 102 may verify the connectivity periodically. A period associated with verifying the connectivity may be different based at least in part on the technology utilized by the user device 102 to access the network (e.g., Internet). For instance, the user device 102 may be configured to utilize a plurality of technologies including stationary technology (e.g., Wi-Fi) or mobile technology (e.g., LTE, CDMA, GSM, etc.) to access the network. When the user device 102 is utilizing the stationary technology, the user device 102 may verify the connectivity at a first periodicity (e.g., every 30 seconds, every 60 seconds, every 2 minutes, etc.). When the user device 102 is utilizing the mobile technology, the user device 102 may verify the connectivity at a second periodicity (e.g., every 5 minutes, every 10 minutes, every 15 minutes, every 30 minutes, etc.). In this way, the user device 102 may enable conservation of resources (e.g., battery life) while using the mobile technology.

In some aspects, the user device 102 may verify the connectivity based at least in part on determining a change in the technology utilized by the user device 102 to access the network (e.g., Internet). In an example, while utilizing the stationary technology, the user device 102 may change its location and begin utilizing the mobile technology to access the network, or vice versa. In this case, based at least in part on determining a change in the technology utilized by the user device 102 to access the network, the user device 102 may verify the connectivity. In this way, the user device 102 may ensure that the change in technology has not resulted in a VPN connection being terminated.

In some aspects, when the user device 102 fails to receive a response ping, the user device 102 may determine that a respective VPN connection, from among the established parallel VPN connections, has been terminated. Example reasons for a termination may include, for example, change in the technology to access the Internet, a VPN server becoming unavailable, etc. In this case, the user device 102 may dynamically adjust the parallel tunneling with the virtual private network servers. In an example, the user device 102 may select another VPN server from the list of optimal VPN servers provided by the VSP control infrastructure 104, may transmit an initiation request to the selected VPN server, and may establish a respective parallel VPN connection with a selected VPN server.

In this way, by establishing and maintaining multiple respective VPN connections (e.g., parallel encrypted tunnels) with the multiple VPN servers and/or by periodically determining the optimal VPN server, the user device may continue to optimally receive the VPN services without terminating established VPN connections and/or without establishing new VPN connections. As a result, efficient utilization of user device resources (e.g., processing resources, memory resources, power consumption resources, battery life, or the like) and VPN resources (computational resources, network bandwidth, management resources, processing resources, memory resources, or the like) may be enabled.

As indicated above, FIGS. 2 and 3 are provided as examples. Other examples may differ from what is described with regard to FIGS. 2 and 3.

FIG. 4 is an illustration of an example process 400 associated with parallel tunneling with VPN servers, according to various aspects of the present disclosure. In some aspects, the process 400 may be performed by an associated memory (e.g., memory 730) and/or an associated processor (e.g., processor 720) related to a user device (e.g., user device 102) based at least in part on executing a client application provided by a VSP control infrastructure. As shown by reference numeral 410, process 400 includes establishing, by a user device, respective parallel virtual private network (VPN) connections with respective VPN servers. For instance, the user device may utilize the associated memory and/or processor to establish respective parallel virtual private network (VPN) connections with respective VPN servers, as discussed elsewhere herein.

As shown by reference numeral 420, process 400 includes determining, by the user device based at least in part on establishing the respective parallel VPN connections, a default VPN server from among the respective VPN servers. For instance, the user device may utilize the associated memory and/or processor to utilize a first exit internet protocol (IP) address to determine, based at least in part on establishing the respective parallel VPN connections, a default VPN server from among the respective VPN servers, as discussed elsewhere herein.

As shown by reference numeral 430, process 400 includes selecting, by the user device based at least in part on determining the default VPN server, the default VPN server as a VPN server from which the user device is to receive a VPN service. For instance, the user device may utilize the associated memory and/or processor to select, based at least in part on determining the default VPN server, the default VPN server as a VPN server from which the user device is to receive a VPN service, as discussed elsewhere herein.

As shown by reference numeral 440, process 400 includes transmitting, by the user device based at least in part on selecting the default VPN server; a request to the default VPN server to receive the VPN service. For instance, the user device may utilize an associated communication interface (e.g., associated communication interface 770) along with the associated memory and/or processor to transmit, based at least in part on selecting the default VPN server; a request to the default VPN server to receive the VPN service, as discussed elsewhere herein.

Process 400 may include additional aspects, such as any single aspect or any combination of aspects described below and/or in connection with one or more other processes described elsewhere herein.

In a first aspect, in process 400, establishing the respective parallel VPN connections includes the user device transmitting, at substantially the same time, respective initiation requests to each of the respective VPN servers.

In a second aspect, alone or in combination with the first aspect, in process 400, the respective parallel VPN connections utilize different VPN protocols.

In a third aspect, alone or in combination with the first through second aspects, in process 400, the respective parallel VPN connections utilize different cryptographic schemes for encryption or decryption of data.

In a fourth aspect, alone or in combination with the first through third aspects, in process 400, determining the default VPN server includes the user device determining the first VPN server, from among the respective VPN servers, to establish a first parallel VPN connection with the user device as the default VPN server.

In a fifth aspect, alone or in combination with the first through fourth aspects, process 400 may include determining, during the established respective parallel VPN connections, an optimal VPN server from among the respective VPN servers.

In a sixth aspect, alone or in combination with the first through fifth aspects, in process 400, establishing the respective parallel VPN connections includes the user device establishing respective encrypted tunnels with each of the respective VPN servers.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with parallel tunneling with VPN servers, according to various aspects of the present disclosure. In some aspects, the process 500 may be performed by an associated memory (e.g., memory 730) and/or an associated processor (e.g., processor 720) related to a user device (e.g., user device 102) based at least in part on executing a client application provided by a VSP control infrastructure. As shown by reference numeral 510, process 500 includes establishing, by a user device, a first parallel virtual private network (VPN) connection with a first VPN server and a second parallel VPN connection with a second VPN server. For instance, the user device may utilize the associated memory and/or processor to establish a first parallel virtual private network (VPN) connection with a first VPN server and a second parallel VPN connection with a second VPN server, as discussed elsewhere herein.

As shown by reference numeral 520, process 500 includes transmitting, by the user device, at substantially the same time, a request for a VPN service to the first VPN server over the first parallel VPN connection and to the second VPN server over the second parallel VPN connection. For instance, the user device may utilize an associated communication interface (e.g., communication interface 770) along with the associated memory and/or processor to transmit, at substantially the same time, a request for a VPN service to the first VPN server over the first parallel VPN connection and to the second VPN server over the second parallel VPN connection, as discussed elsewhere herein.

As shown by reference numeral 530, process 500 includes determining, by the user device based at least in part on transmitting the request, the first VPN server as an optimal VPN server when the first VPN server provides the VPN service before the second VPN server, or the second VPN server as the optimal VPN server when the second VPN server provides the VPN service before the second VPN server. For instance, the user device may utilize the associated memory and/or processor to determine, based at least in part on transmitting the request, the first VPN server as an optimal VPN server when the first VPN server provides the VPN service before the second VPN server, or the second VPN server as the optimal VPN server when the second VPN server provides the VPN service before the second VPN server, as discussed elsewhere herein.

As shown by reference numeral 540, process 500 includes transmitting, by the user device based at least in part on selecting the optimal VPN server; requests for VPN services to the optimal VPN server. For instance, the user device may utilize the associated communication interface, memory, and processor to transmit, based at least in part on selecting the optimal VPN server; requests for VPN services to the optimal VPN server, as discussed elsewhere herein.

Process 500 may include additional aspects, such as any single aspect or any combination of aspects described below and/or in connection with one or more other processes described elsewhere herein.

In a first aspect, in process 500, transmitting the request includes the user device transmitting a data request for a threshold amount of data of interest to be retrieved from a host device and to be provided to the user device.

In a second aspect, alone or in combination with the first aspect, in process 500, establishing the first and second parallel VPN connections includes transmitting, at substantially the same time, a first initiation request to the first VPN server and a second initiation request to the second VPN server.

In a third aspect, alone or in combination with the first through second aspects, in process 500, determining the optimal VPN server includes the user device determining a change in a technology utilized by the user device to access the Internet.

In a fourth aspect, alone or in combination with the first through third aspects, in process 500, the first parallel VPN connection utilizes a first VPN protocol and the second VPN connection utilizes a second VPN protocol, the first VPN protocol being different than the second VPN protocol.

In a fifth aspect, alone or in combination with the first through fourth aspects, in process 500, the first parallel VPN connection utilizes a first algorithm for encryption or decryption of data and the second VPN connection utilizes a second algorithm for encryption or decryption of data, the first algorithm being different than the second algorithm.

In a sixth aspect, alone or in combination with the first through fifth aspects, in process 500, determining the optimal VPN server includes the user device determining the optimal VPN server periodically.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with parallel tunneling with VPN servers, according to various aspects of the present disclosure. In some aspects, the process 600 may be performed by an associated memory (e.g., memory 730) and/or an associated processor (e.g., processor 720) related to a user device (e.g., user device 102) based at least in part on executing a client application provided by a VSP control infrastructure. As shown by reference numeral 610, process 600 includes establishing, by a user device at substantially the same time, parallel VPN connections including a first respective virtual private network (VPN) connection with a first VPN server and a second respective VPN connection with a second VPN server. For instance, the user device may utilize the associated memory and/or processor to establish, at substantially the same time, parallel VPN connections including a first respective virtual private network (VPN) connection with a first VPN server and a second respective VPN connection with a second VPN server, as discussed elsewhere herein.

As shown by reference numeral 620, process 600 includes verifying, by the user device after establishing the parallel VPN connections, connectivity of the first respective VPN connection with the first VPN server and of the second respective VPN connection with the second VPN server. For instance, the user device may utilize the associated memory and/or processor to verify, after establishing the parallel VPN connections, connectivity of the first respective VPN connection with the first VPN server and of the second respective VPN connection with the second VPN server, as discussed elsewhere herein.

As shown by reference numeral 630, process 600 includes determining, by the user device based at least in part on verifying the connectivity, that the first respective VPN connection is terminated. For instance, the user device may utilize the associated memory and/or processor to configure the VPN server to determine, based at least in part on verifying the connectivity, that the first respective VPN connection is terminated, as discussed elsewhere herein.

As shown by reference numeral 640, process 600 includes transmitting, by the user device based at least in part on determining that the first respective VPN connection is terminated, an initiation request to a third VPN server to establish a third respective VPN connection with the third VPN server. For instance, the user device may utilize an associated communication interface (e.g., communication interface 770) along with the associated memory and/or processor to transmit, based at least in part on determining that the first respective VPN connection is terminated, an initiation request to a third VPN server to establish a third respective VPN connection with the third VPN server, as discussed elsewhere herein.

As shown by reference numeral 650, process 600 includes establishing, by the user device based at least in part on transmitting the initiation request, the third respective VPN connection with the third VPN server such that the parallel VPN connections include the second respective VPN connection with a second VPN server and the third respective VPN connection with the third VPN server. For instance, the user device may utilize the associated memory and/or processor to establish, based at least in part on transmitting the initiation request, the third respective VPN connection with the third VPN server such that the parallel VPN connections include the second respective VPN connection with a second VPN server and the third respective VPN connection with the third VPN server, as discussed elsewhere herein.

Process 600 may include additional aspects, such as any single aspect or any combination of aspects described below and/or in connection with one or more other processes described elsewhere herein.

In a first aspect, wherein, in process 600, verifying the connectivity includes the user device transmitting, at substantially the same time, a first query ping to the first VPN server via the first respective VPN connection to determine connectivity with the first VPN server, and a second query ping to the second VPN server via the second respective VPN connection to determine connectivity with the second VPN server.

In a second aspect, alone or in combination with the first aspect, in process 600, verifying the connectivity includes the user device verifying the connectivity based at least in part on determining a change in a technology utilized by the user device to access the Internet.

In a third aspect, alone or in combination with the first through second aspects, in process 600, verifying the connectivity includes the user device verifying the connectivity based at least in part on determining a change in a location of the user device.

In a fourth aspect, alone or in combination with the first through third aspects, in process 600, verifying the connectivity includes the user device verifying the connectivity periodically, a periodicity associated with verifying the connectivity being based at least in part on a technology utilized by the user device to access the Internet.

In a fifth aspect, alone or in combination with the first through fourth aspects, in process 600, determining that the first respective VPN connection is terminated includes the user device determining that the user device failed to receive a response ping in response to a query ping transmitted by the user device to the first VPN server.

In a sixth aspect, alone or in combination with the first through fifth aspects, in process 600, establishing the first and second respective VPN connections includes the user device transmitting, at substantially the same time, a first initiation request to the first VPN server and a second initiation request to the second VPN server.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, environments, infrastructures, components, devices or the like described elsewhere herein (e.g., VPN server, the VSP control infrastructure, etc.) and may be utilized for performing the example processes described elsewhere herein. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein.

In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user device, comprising: a memory; and a processor communicatively coupled to the memory, the memory and the processor being configured to:
    establish a first parallel virtual private network (VPN) connection with a first VPN server and a second parallel VPN connection with a second VPN server;
    transmit, at substantially the same time, a first service request for a VPN service to the first VPN server over the first parallel VPN connection and a second service request for the VPN service to the second VPN server over the second parallel VPN connection;
    determine, based at least in part on transmitting the first service request and the second service request, the first VPN server as an optimal VPN server when the first VPN server provides the VPN service before the second VPN server, or the second VPN server as the optimal VPN server when the second VPN server provides the VPN service before the first VPN server; and
    transmit, based at least in part on selecting the optimal VPN server, subsequent service requests for VPN services to the optimal VPN server.

2. The user device of claim 1, wherein the first service request or the second service request for the VPN service includes a data request for a threshold amount of data of interest to be retrieved from a host device and to be provided to the user device.

3. The user device of claim 1, wherein, to establish the first and second parallel VPN connections, the memory and the processor are configured to transmit, at substantially the same time, a first initiation request to the first VPN server and a second initiation request to the second VPN server.

4. The user device of claim 1, wherein, to determine the optimal VPN server, the memory and the processor are configured to determine a change in a technology utilized by the user device to access the Internet.

5. The user device of claim 1, wherein the first parallel VPN connection utilizes a first VPN protocol and the second VPN connection utilizes a second VPN protocol, the first VPN protocol being different than the second VPN protocol.

6. The user device of claim 1, wherein the first parallel VPN connection utilizes a first algorithm for encryption or decryption of data and the second VPN connection utilizes a second algorithm for encryption or decryption of data, the first algorithm being different than the second algorithm.

7. The user device of claim 1, wherein, to determine the optimal VPN server, the memory and the processor are configured to determine the optimal VPN server periodically.

8. A method, comprising:
    establishing, by a user device, a first parallel virtual private network (VPN) connection with a first VPN server and a second parallel VPN connection with a second VPN server;
    transmitting, by the user device, at substantially the same time, a first service request for a VPN service to the first VPN server over the first parallel VPN connection and a second service request for the VPN service to the second VPN server over the second parallel VPN connection;
    determining, by the user device based at least in part on transmitting the first service request and the second service request, the first VPN server as an optimal VPN server when the first VPN server provides the VPN service before the second VPN server, or the second VPN server as the optimal VPN server when the second VPN server provides the VPN service before the first VPN server; and transmitting, by the user device based at least in part on selecting the optimal VPN server, subsequent service requests for VPN services to the optimal VPN server.

9. The method of claim 8, wherein, transmitting the first service request or the second service request includes the user device transmitting a data request for a threshold amount of data of interest to be retrieved from a host device and to be provided to the user device.

10. The method of claim 8, wherein establishing the first and second parallel VPN connections includes transmitting, at substantially the same time, a first initiation request to the first VPN server and a second initiation request to the second VPN server.

11. The method of claim 8, wherein determining the optimal VPN server includes the user device determining a change in a technology utilized by the user device to access the Internet.

12. The method of claim 8, wherein the first parallel VPN connection utilizes a first VPN protocol and the second VPN connection utilizes a second VPN protocol, the first VPN protocol being different than the second VPN protocol.

13. The method of claim 8, wherein the first parallel VPN connection utilizes a first algorithm for encryption or decryption of data and the second VPN connection utilizes a second algorithm for encryption or decryption of data, the first algorithm being different than the second algorithm.

14. The method of claim 8, wherein determining the optimal VPN server includes the user device determining the optimal VPN server periodically.

15. A non-transitory computer-readable medium configured to store instructions, which when executed by a processor associated with a user device, configure the processor to:
 establish a first parallel virtual private network (VPN) connection with a first VPN server and a second parallel VPN connection with a second VPN server;
 transmit, at substantially the same time, a first service request for a VPN service to the first VPN server over the first parallel VPN connection and a second service request for the VPN service to the second VPN server over the second parallel VPN connection;
 determine, based at least in part on transmitting the first service request and the second service request, the first VPN server as an optimal VPN server when the first VPN server provides the VPN service before the second VPN server, or the second VPN server as the optimal VPN server when the second VPN server provides the VPN service before the first VPN server; and transmit, based at least in part on selecting the optimal VPN server, subsequent service requests for VPN services to the optimal VPN server.

16. The non-transitory computer-readable medium of claim 15, wherein the first service request or the second service request for the VPN service includes a data request for a threshold amount of data of interest to be retrieved from a host device and to be provided to the user device.

17. The non-transitory computer-readable medium of claim 15, wherein, to establish the first and second parallel VPN connections, the processor is configured to transmit, at substantially the same time, a first initiation request to the first VPN server and a second initiation request to the second VPN server.

18. The non-transitory computer-readable medium of claim 15, wherein, to determine the optimal VPN server, the processor is configured to determine a change in a technology utilized by the user device to access the Internet.

19. The non-transitory computer-readable medium of claim 15, wherein the first parallel VPN connection utilizes a first VPN protocol and the second VPN connection utilizes a second VPN protocol, the first VPN protocol being different than the second VPN protocol.

20. The non-transitory computer-readable medium of claim 15, wherein the first parallel VPN connection utilizes a first algorithm for encryption or decryption of data and the second VPN connection utilizes a second algorithm for encryption or decryption of data, the first algorithm being different than the second algorithm.

* * * * *